US009842223B2

(12) United States Patent
Thomas et al.

(10) Patent No.: US 9,842,223 B2
(45) Date of Patent: *Dec. 12, 2017

(54) FUNCTIONAL ARCHITECTURE PATTERN FOR SAFETY RELATED APPLICATIONS

(71) Applicant: DANA BELGIUM N.V., Brugge (BE)

(72) Inventors: Christophe Thomas, Drongen (BE); Steven Dumoulin, Roeselare (BE); Bjorn Aelvoet, Lovendegem (BE)

(73) Assignee: Dana Belgium, N.V., Brugge (BE)

( * ) Notice: Subject to any disclaimer, the term of this patent is extended or adjusted under 35 U.S.C. 154(b) by 65 days.

This patent is subject to a terminal disclaimer.

(21) Appl. No.: 14/953,538

(22) Filed: Nov. 30, 2015

(65) Prior Publication Data

US 2016/0231989 A1    Aug. 11, 2016

Related U.S. Application Data

(62) Division of application No. 13/261,967, filed as application No. PCT/EP2013/057385 on Apr. 9, 2013, now Pat. No. 9,235,727.

(51) Int. Cl.
| | |
|---|---|
| *G06F 9/44* | (2006.01) |
| *G06F 21/62* | (2013.01) |
| *G06F 21/74* | (2013.01) |
| *G06F 9/54* | (2006.01) |

(52) U.S. Cl.
CPC ............ *G06F 21/6236* (2013.01); *G06F 8/10* (2013.01); *G06F 8/70* (2013.01); *G06F 9/54* (2013.01); *G06F 21/74* (2013.01)

(58) Field of Classification Search
CPC .. G06F 21/74; G06F 8/10; G06F 9/54; H02H 3/00
See application file for complete search history.

(56) References Cited

U.S. PATENT DOCUMENTS

| | | | |
|---|---|---|---|
| 7,813,820 | B2 | 10/2010 | Opem et al. |
| 8,180,466 | B2 | 5/2012 | Longsdorf et al. |
| 8,781,882 | B1 | 7/2014 | Arboletti et al. |

(Continued)

FOREIGN PATENT DOCUMENTS

JP    2010271759 A    12/2010

OTHER PUBLICATIONS

Piovesan, A. et al.: Experience with ISO 26262 ASIL Decomposition; Automotive SPIN, Milano, Feb. 17, 2011.

*Primary Examiner* — Tuan Vu
(74) *Attorney, Agent, or Firm* — Marshall & Melhorn, LLC

(57) ABSTRACT

A functional architecture pattern has a first software module, an operating system module, a first board support package, and a first microcomputer. The functional architecture pattern further has a second software module, a second board support package, and a second microcomputer that are logically separated from the first software module, the operating system module, the first board support package, and the first microcomputer. The first software module is developed according to quality management standards, while the operating system module, both first and second board support packages, and the third software module are developed according to safety integrity levels standards so as to make a logical split-off on three levels between the first software module software and the second software module.

15 Claims, 10 Drawing Sheets

(56) References Cited

U.S. PATENT DOCUMENTS

| | | |
|---|---|---|
| 9,235,727 B2 * | 1/2016 | Thomas .................... G06F 8/10 |
| 2008/0209211 A1 | 8/2008 | Grgic et al. |
| 2009/0228118 A1 | 9/2009 | Von Schwertfuehrer et al. |
| 2012/0137160 A1 | 5/2012 | Larsson |
| 2015/0124363 A1 | 5/2015 | Garbossa |
| 2015/0242233 A1 | 8/2015 | Brewerton et al. |

* cited by examiner

General-Purpose Registers

```
 0         31 32         63
(upper) GPR0¹ (lower)
        GPR1              General
        GPR2              purpose
         ...              registers
        GPR31
```

L1 Cache (Read Only)

spr 515 L1CFG0³   L1 cache configuration register 0

User-Level Registers
Instruction-Accessible Registers

```
              31 32         63
spr 9         CR            Condition reg.
spr 8         CTR           Count register
spr 1         LR            Link register
              XER           Integer excp. reg.
spr 512       SPEFSCR³      SP/embedded FP
                            status/contl. reg.
              ACC³          Accumulator
```

User General SPR (Read/Write)

```
              32        63
spr 256      USPRG0²    User SPR general 0
```

General SPRs (Read-Only)

```
spr 260   SPRG4
spr 261   SPRG5    SPR general
spr 262   SPRG6    registers 4-7
spr 263   SPRG7
```

Time-Base Registers (Read-Only)

```
spr 288   TBL    Time base lower/upper
spr 289   TBU    
```

¹The 64-bit GPR registers are accessed by the SPE as separate 32 bit registers by SPE instructions. Only SPE vector instructions can access the upper-word.
²USPRG0 is a separate physical register from SPRG0.
³EIS-specific registers; not part of the Book E architecture.

FIG. 3A

Supervisor-Level Registers

Interrupt Registers

| | 32 | 63 | |
|---|---|---|---|
| spr | 63 | IVPR | Intrupt. vect. prefix reg. |
| spr | 26 | SRR0 | Save/restore |
| spr | 27 | SRR1 | registers 0/1 |
| spr | 58 | CSRR0 | Critical SRR 0/1 |
| spr | 59 | CSRR1 | |
| spr | 574 | DSRR0[3] | Debug Interrupt |
| spr | 575 | DSRR1[3] | SRR0/1 |
| spr | 62 | ESR | Except. syndrome register |
| spr | 572 | MCSR[3] | Machine check syndrome register |
| spr | 61 | DEAR | Data exception address register |

| | 32 | 63 | |
|---|---|---|---|
| spr | 400 | IVOR0 | |
| spr | 401 | IVOR1 | Intrupt. vect. offset registers 0-15[4] |
| | ... | | |
| spr | 415 | IVOR15 | |
| spr | 528 | IVOR32[3] | |
| spr | 529 | IVOR33[3] | Intrupt. vect. offset registers 32-34 |
| spr | 530 | IVOR34[3] | |

MMU Control and Status (Read/Write)

| | | | |
|---|---|---|---|
| spr | 1012 | MMUCSR0[3] | MMU contl. & status reg. 0 |
| spr | 624 | MAS0[3] | |
| spr | 625 | MAS1[3] | |
| spr | 626 | MAS2[3] | MMU asst. reg. |
| spr | 627 | MAS3[3] | 0-4 and 6 |
| spr | 628 | MAS4[3] | |
| spr | 630 | MAS6[3] | |
| spr | 48 | PID0 | Process ID register 0 |

Configuration Registers

| | 32 | 63 | |
|---|---|---|---|
| spr | 1023 | MSR | Mach. state reg. |
| | | SVR[3] | System version register |
| spr | 286 | PIR | Processor ID reg. |
| spr | 287 | PVR | Processor version register |

Timer/Decrementer Registers

| | | | |
|---|---|---|---|
| spr | 22 | DEC | Decrementer |
| spr | 54 | DECAR | Decrementer auto-reload reg. |
| spr | 284 | TBL | Time base lower/upper |
| spr | 285 | TBU | |
| spr | 340 | TCR | Time control reg. |
| spr | 336 | TSR | Time status reg. |

[4]IVOR9 (handles auxiliary processor unavailable interrupt) is defined by the EIS but not supported by the e200z6.

FIG. 3B

Supervisor-Level Registers

Interrupt Registers

Debug Registers

| | 32 | 63 | |
|---|---|---|---|
| spr 308 | DBCR0 | | Debug control |
| spr 309 | DBCR1 | | register 0-3 |
| spr 310 | DBCR2 | | |
| spr 561 | DBCR3 | | |
| spr 304 | DBSR | | Debug status reg. |
| spr 562 | DBCNT[5] | | Debug count reg. |
| spr 312 | IAC1 | | Instruction address |
| spr 313 | IAC2 | | compare |
| spr 314 | IAC3 | | register 1-4 |
| spr 315 | IAC4 | | |
| spr 316 | DAC1 | | Data address |
| spr 317 | DAC2 | | compare |
| | | | registers 1 and 2 |

MMU Control and Status (Read Only)

| | 32 | 63 | |
|---|---|---|---|
| spr 1015 | MMUCFG[3] | | MMU config. |
| spr 688 | TLB0CFG[3] | | TLB config. |
| spr 689 | TLB1CFG[3] | | 0/1 |

L1 Cache (Read/Write)

| | 32 | 63 | |
|---|---|---|---|
| spr 1010 | L1CSR0[3] | | L1 cache contl./ status reg. 0 |
| spr 1018 | L1FINV0[5] | | L1 cache flush/invalid. contl. register 0 |

Configuration Registers

Miscellaneous Registers

| | 32 | 63 | |
|---|---|---|---|
| spr 1008 | HID0[3] | | Hardware |
| spr 1009 | HID1[3] | | Implementation dependent 0-1 |
| spr 1013 | BUCSR[5] | | Branch control and status reg. |
| spr 272-279 | SPRG0-7 | | Gen. SPRs 0-7 |

Context Control (Read/Write)

| | 32 | 63 | |
|---|---|---|---|
| spr 560 | CTXCR[5] | | Context control register |
| spr 568 | ALTCTXCR[5] | | Altern. context control register |

[5]e200z6 –specific registers

FIG. 3C

| Field | Description |
|---|---|
| V | Valid bit for entry |
| TS | Translation address space (compared with AS bit of the current access) |
| TID [0-7] | Translation ID (compared with PID0 or TIDZ (all zeros)) |
| EPN [0-19] | Translation ID (compared with PID0 or TIDZ (all zeros)) |
| RPN [0-19] | Real page number (translated address) |
| | Encoded page size |
| | 0000 Reserved |
| | 0001 4 Kbytes |
| | 0010 16 Kbytes |
| | 0011 64 Kbytes |
| SIZE [0-3] | 0100 256 Kbytes |
| | 0101 1 Mbytes |
| | 0110 4 Mbytes |
| | 0111 16 Mbytes |
| | 1000 64 Mbytes |
| | 1001 256 Mbytes |
| | All others — reserved |
| PERMIS [0-5] | Supervisor execute, write, and read permission bits, and user execute, write, and read permission bits |
| WIMGE | Memory / cache attributes (write-through, cache-inhibit, memory Coherence required, guarded, endian) |
| U0-U3 | User attribute bitsNused only by software |
| IPROT | Invalidation protection |

FIG. 7

FUNCTIONAL ARCHITECTURE PATTERN FOR SAFETY RELATED APPLICATIONS

RELATED APPLICATION

This application claims the benefit under 35 U.S.C. §119 (e) of U.S. Provisional Patent Application Ser. No. 61/621,656 filed Apr. 9, 2012 and of U.S. Provisional Patent Application Ser. No. 61/663,282 filed Jun. 22, 2012, claims benefit of 371 International PCT Application No. PCT/EP2013/057385, filed Apr. 9, 2013, and under 35 U.S.C. §120, of U.S. patent application Ser. No. 13/261,967, filed Oct. 8, 2014, which applications are incorporated by reference herein in their entirety.

FIELD OF THE INVENTION

The present invention relates to a functional architecture pattern used in a process to decompose software. More particularly, the present invention relates to a functional architecture pattern used in a process to decompose safety software.

BACKGROUND OF THE INVENTION

Currently, governments and industries are imposing functional safety standards on a variety of entities, for example, the automotive industry. Usually, these functional safety standards are realized by way of safety software that utilizes standard functional architecture patterns. Unfortunately, these functional safety standards, software, and architecture patterns are very rigid and do not give OEMs or integrators enough flexibility to maintain or upgrade the functionality of the safety-related systems, without incurring considerable added costs to an overall system.

Specifically, functional safety standards require time consuming design and certified validation, where no integration with associated non-safety related applications exists. Hence, expensive hardware and software designs are required because the safety software and standard functional architecture patterns are dedicated. When upgrades are required to a non-safety related application, both the safety application and the associated non-safety related application must be recertified, thereby adding costs and loss of functional system time to an entity.

What is sought is a way to separate the safety related application from the associated non-safety related application, so that when the associated non-safety related application requires maintenance and upgrading, the safety related application does not have to be recertified. Thereby, saving an entity much time and labor costs.

SUMMARY OF THE INVENTION

A functional architecture pattern has a first software module (SW), an operating system module (OS), a first board support package (BSP1), and a first microcomputer (uC1). The functional architecture pattern further has a second software module (SG), a second board support package (BSP2), and a second microcomputer (uC2) that are logically separated from the first software module, the operating system module, the first board support package, and the first microcomputer. The first software module is developed according to quality management (QM) standards, while the operating system module, both first and second board support packages, and the third software module are developed according to safety integrity levels (SIL) standards so as to make a logical split-off on three levels between the first software module software and the second software module.

Further objects and advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 3A is a first listing of user-level and supervisor-level registers of an e200z6 core of the MPC5668EG processor of FIG. 2;

FIG. 3B is a second listing of the user-level and supervisor-level registers of the e200z6 core of the MPC5668EG processor of FIG. 2;

FIG. 3C is a third listing of the user-level and supervisor-level registers of the e200z6 core of the MPC5668EG processor of FIG. 2;

FIG. 7 is a TLB entry bit fields listing in accordance with the present invention;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Table 1 lists some of the abbreviations used throughout the disclosure.

TABLE 1

| Abbreviations | |
| --- | --- |
| BSP: Board support packages | RAM: Random Access Memory |
| ECC: Error correction code | RTOS: Real-time operating system |
| inet: Internet source | SG: Safety goal(s) |
| MMU: Memory management unit | SPS: Sharepoint site |
| MSR: Machine status register | SW-C: Software component(s) |
| PDF: Portable document format | SW-S/A: Software sensor/ actuator component(s) |
| PID: Process identifier | TLB: Translation lookaside buffer |
| QM: Quality Management | uC: Microcontroller |

Some of the advantages of the instant invention that will become apparent are the following. Design and validate are only required of a small part of the functional safety related application according to standards known as Safety Integrity Levels (SIL). Design and validation of major parts of the functional safety related application are achieved according to Quality Management (QM) levels. Non-safety related applications (design and validation according to QM level) are integrated with safety related applications. The design for all applications (safety related or not) is achieved with generic hardware/software. Hence, major parts of functional safety related applications are upgraded without re-certification.

Figure 1:
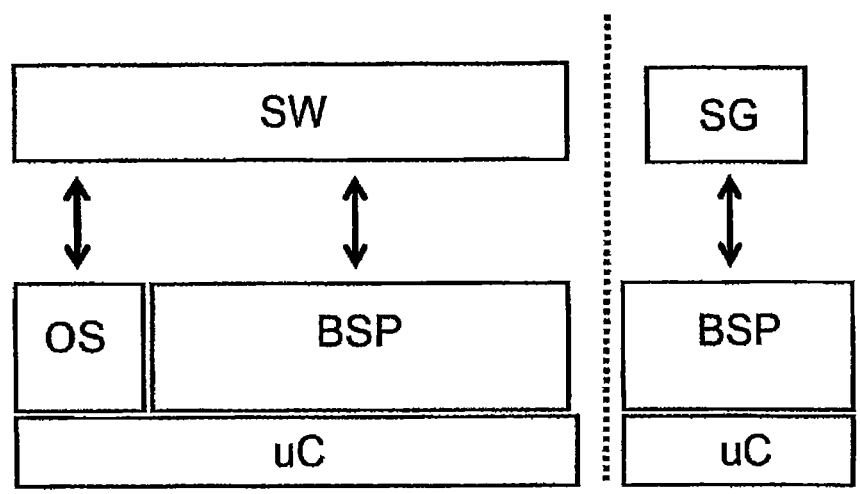
FIG. 1 is a block diagram of a first functional architecture in accordance with present invention.

FIG. 1 illustrates a first pattern (functional architecture) in accordance with the present invention that uses the following principles. As indicated by the dashed vertical line separating the SW and SG modules, an SIL decomposition is used to make a split-off between safety-related generic reusable software (called the SW module) and safety-related application specific software (called the SG module), wherein the SW and SG modules have their own separate logical unit (uC). Therefore, it is guaranteed that the SW cannot interfere (such as write code, write memory, and/or write data) with the SG.

Also, the SW implements safety goals in a generic functional way according to the QM level. Thereby, the SG implements safety goals in a dedicated application-specific way according to the SIL level on three levels.

Regarding safety-related function monitoring, the SG uses inputs and outputs of its logical unit in order to diagnose if the safety goals are still satisfied. Regarding safety-related application monitoring, the SG uses intermediate results of the SW in order to diagnose if the safety goals are satisfied. Regarding generic application monitoring, the SG uses a question-answer algorithm to check if the SW logical unit is working correctly.

To obtain these results, the following logical entities exist, uC (logical unit) modules are hardware, OS (operating system) module that is developed according to the SIL level, BSP (board support packages) modules that are also developed according to the SIL level, SW (software) module that is developed according to QM level, and SG module that is developed according to the SIL level.

Figure 2:
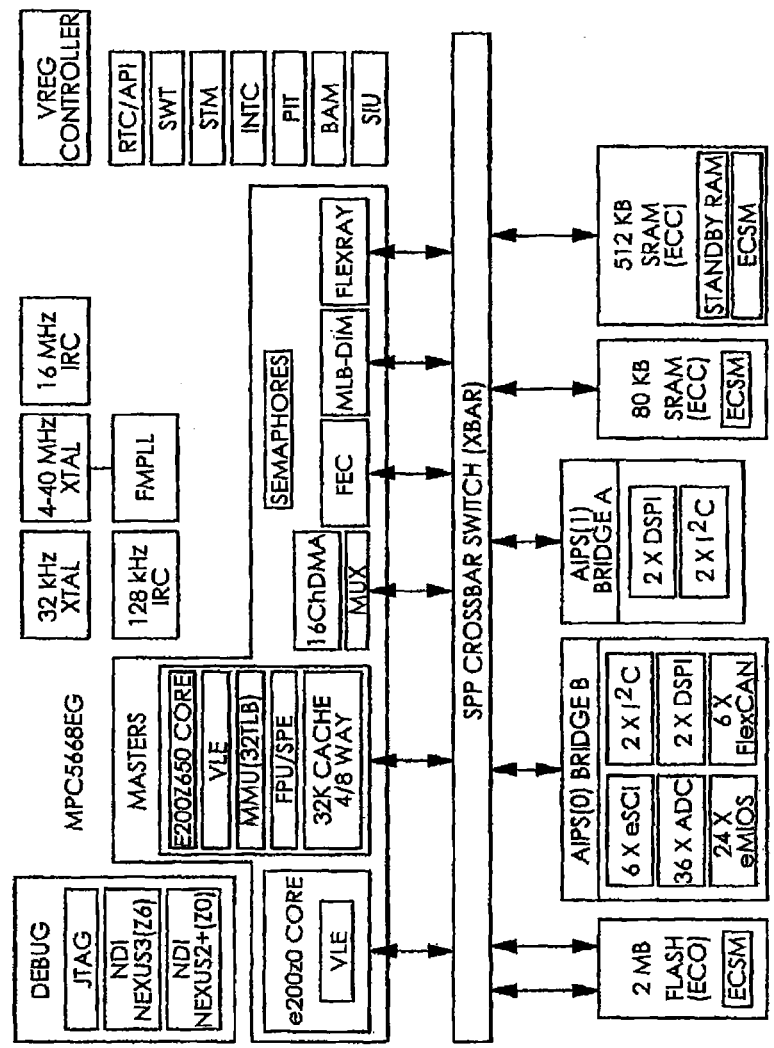
FIG. 2 is a block diagram of an MPC5668EG processor in accordance with the present invention.
Figure 8:
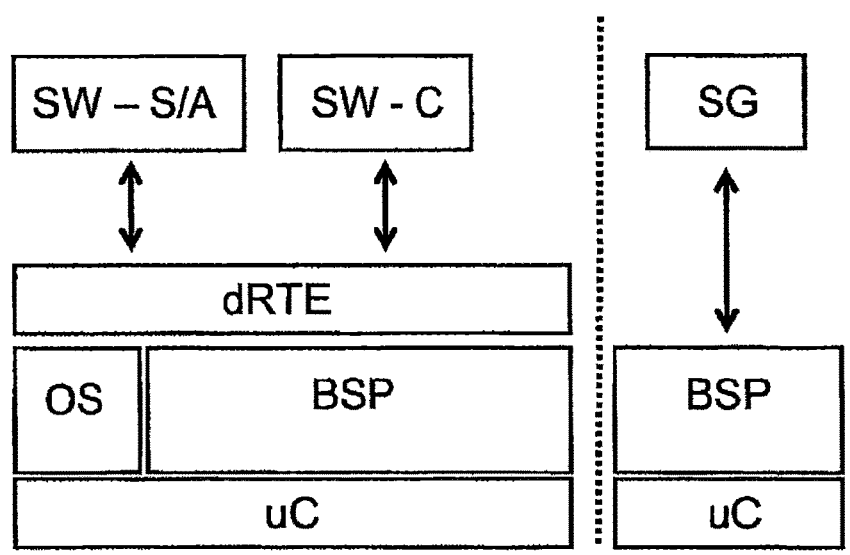
FIG. 8 is a block diagram of a second functional architecture in accordance with the present invention.

FIG. 2 illustrates the specifics for a global memory manager controller MPC5668EG implemented in both of the preferred embodiments that are respectively illustrated in FIGS. 1 and 8. In the supervisor mode/user mode, an e200z6 core (see MASTERS box in upper portion of FIG. 2) defines the following two levels of programming environments. 1) a user level that defines the base user-level instruction set, registers, data types, memory conventions, and the memory and programming models seen by application programmers and 2) a supervisor level that defines supervisor-level resources typically required by an operating system, i.e., the memory management model, supervisor level registers, and the exception model. However, one skilled in the art recognizes that a different global memory manager controller having the hereinto described elements and functionality of the MPC5668EG device could be used in place thereof.

FIGS. 3A, 3B, and 3C show the e200z6 core register set for the MPC5668EG controller, which indicates registers that are accessible in supervisor mode and those accessible in user mode. The MSR register of the e200z6 core of the MPC5668EG controller, which contains a "problem state" (PR) bit where a "0" indicates that the processor is in a supervisor mode, where any instruction can be executed, and any resource (for example, general purpose GPRs, supervisor purpose SPRs, machine status MSR registers) can be accessed. On the other hand, the "1" bit indicates that the processor is in a user mode, where no privileged instructions can be executed, and no access to any privileged resources is permitted.

Figure 4:
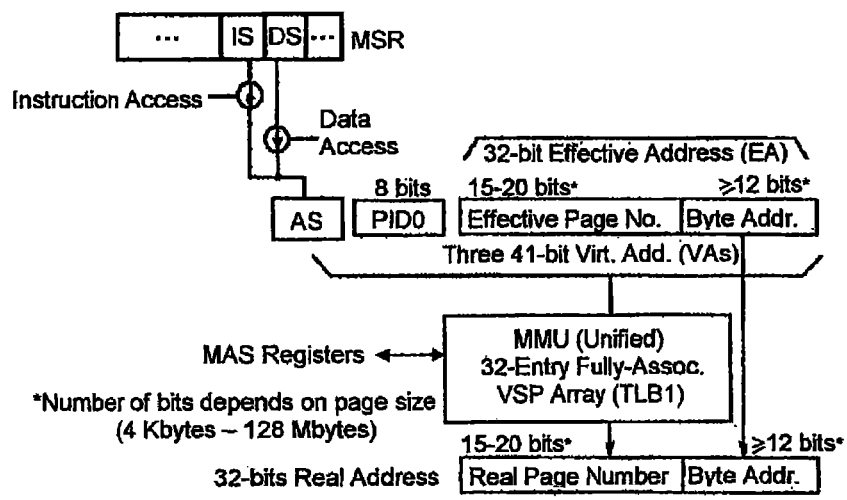
FIG. 4 is an effective address to real address translation flow diagram in accordance with the present invention.

The MMU, which is shown in the "Masters" block of the MPC5668EG processor in FIG. 2, is utilized in the present invention to achieve a clear separation between safety-related software and other QM software. To achieve this separation, several architectural choices have been made that impact the requirements for the MPC5668EG processor. The MPC5668EG processor utilizes the supervisor/user mode, MMU, dual RAM, and dual cores (e200z6 and e200z0), wherein the MPC5668EG provides an MMU with 32-bit effective addresses that are translated to 32-bit real addresses using a 41-bit interim virtual address (see FIG. 4), the MMU may only be available to the e200z6 core and not the e200z0 core, a PID (process identifier) is associated with each effective address (instruction or data), the e200z6 core implements a single PID register (called PID0), where several values for PID0 are defined herebelow.

Figure 5:
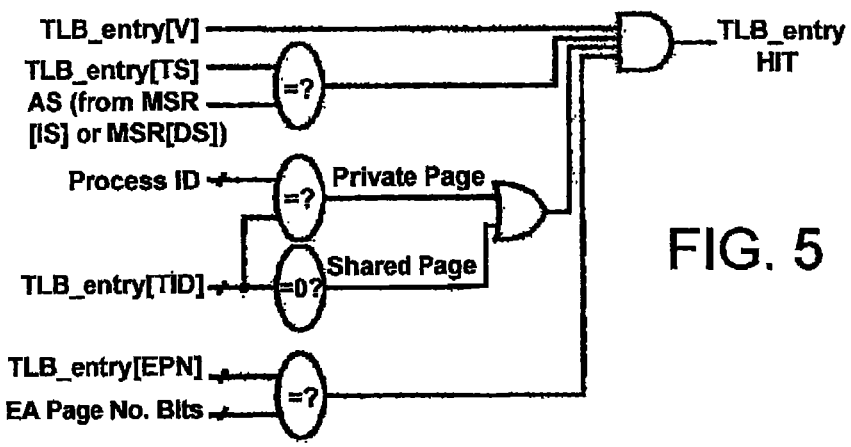
FIG. 5 is a virtual address and TLB entry compare process diagram in accordance with the present invention.
Figure 6:
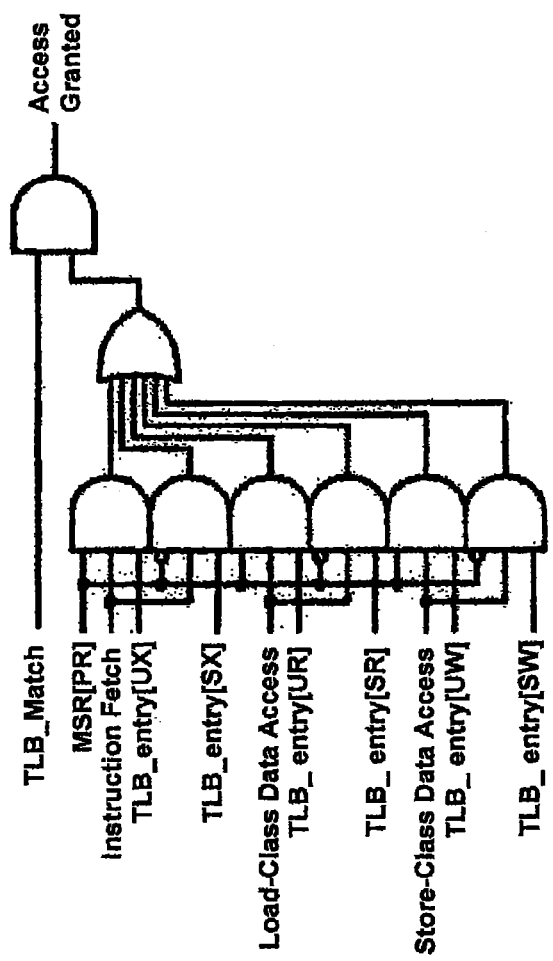
FIG. 6 is an MMU granting of access permissions diagram in accordance with the present invention.

Further, the translation is done based on TLB entries, specifically, if the PID value in the PID0 matches with a TLB entry in which all of the other criteria are met (see FIG. 6), then that entry will be used for translation. If the translation match was successful, then permission bits are checked. A hit to multiple TLB entries is considered to be a programming error (see FIG. 5), wherein, if this occurs, the TLB generates an invalid address and TLB entries may be corrupted (an exception will not be reported).

Regarding the MMU configuration, the TLB entries need to be defined at initialization time. An example of a TLB entry is shown in the listing of FIG. 7. Also, the MPC5668EG has two SRAM units; one unit with 80 KB on board and a second unit with 512 KB on board, where both units are provided by the ECC. It is preferred that both SRAM units are to be used and that the ECC, along with both e200z6 core and e200z0 cores are to be supported.

An architectural overview of a second pattern is given in FIG. 8 where it is illustrated as a functional architecture that is in accordance with the present invention that uses the following principles. As indicated by the dashed vertical line separating the SW-S/A (sensors/actuators), SW-C (components), and a dRTE (Dana run time environment) module from the SG. The SW-S/A, SW-C, and dRTE modules are considered as developed according to QM standards. The OS, both BSP's, and SG modules are considered as developed according to SIL standards. Therefore, as in the first functional architectural pattern of FIG. 1, an SIL decomposition is used to make a split-off between a safety-related generic reusable software SW-S/A, SW-C and the safety-related application specific software SG, wherein these SW's and the SG have their own separate logical unit. Therefore, it is guaranteed that the SW's cannot interfere (such as write code, write memory, and/or write data) with the SG.

The second pattern architecture allows the SW-S/A, SW-C, and dRTE modules and OS, both BSP's, and SG modules to reside in the same memory space (code and data space), and on the same uC, without the S/A, SW-C, and dRTE modules being able to corrupt the OS, both BSP's, and SG modules.

For the second pattern, the SG runs on a separate (e200z0) core of the MCP5668EG, where the SW-C only communicates within itself by means of the dRTE. Further, the SW-S/A makes a link between the left BSP and the SW-C. Although the S/A, SW-C, and dRTE are running in supervisor mode (which is discussed in detail herebelow), the S/A, SW-C, and dRTE are shown separately in FIG. 8.

System requirements for the second pattern are to support both the user mode/supervisor mode features, wherein both cores e200z6 and e200z0 are supported, both SRAM units are given ECC support, and the MMU feature is supported. Also, architecture support is given to both the user mode/supervisor mode, both cores e200z6 and e200z0, the 80 KB SRAM and the 512 KB SRAM, both with ECC. The MMU in the MCP5668EG of the second pattern is integrated with Actia (Automotive Corporation of France) BSP modules.

Figure 9:
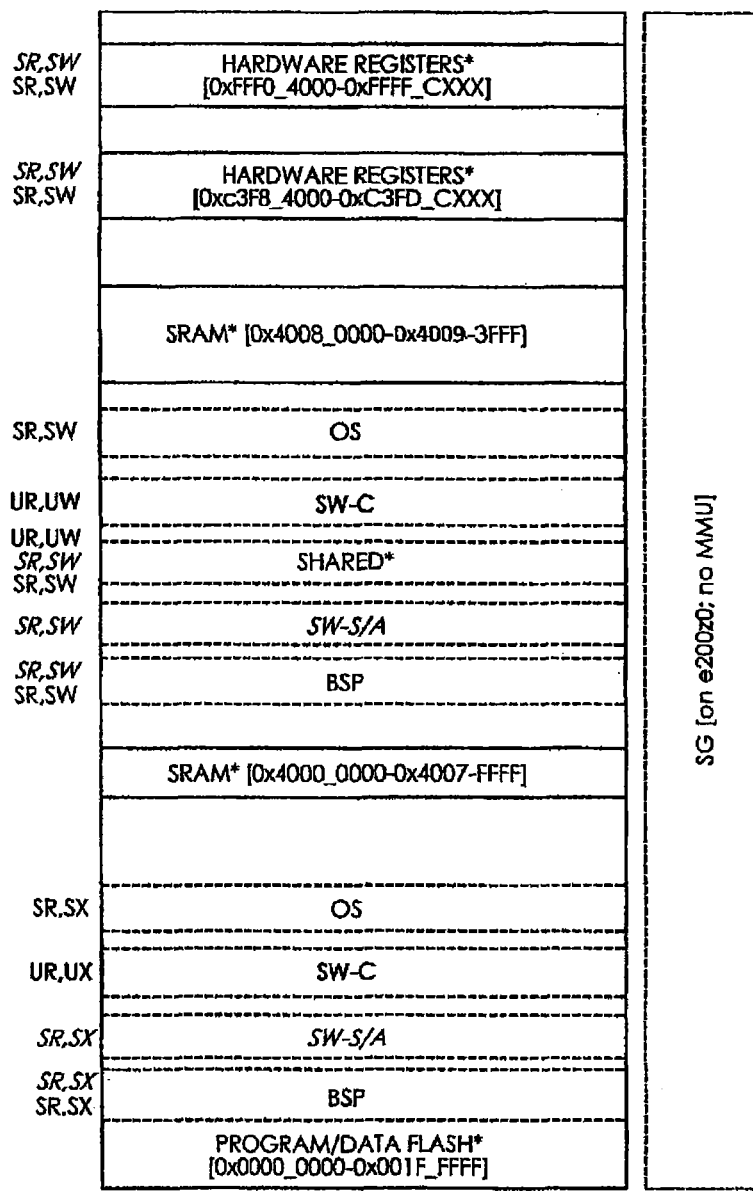
FIG. 9 is an architectural structure of memory addresses for SG on an e200z0 core in accordance with the present invention.

FIG. 9 illustrates the second pattern from a memory address space point-of-view where the following items are defined. The BSP is the driver code/memory, the OS is supplied by RTOS, SG is the safety-critical code/memory, SW-S/A is the sensor and actuator software components code/memory, SW-C module is the application software components.

OS interrupts run in supervisor mode, BSP interrupts run in supervisor mode, and the SW-S/A runs in supervisor mode, where the SW-S/A is the only software component(s) that may access BSP. Also, the SW-S/A may read and write the shared memory.

The SW-C runs in user mode but may not access BSP, nor read and write the shared memory. The SG runs in supervisor mode and may access BSP and may read the shared memory.

The second architectural concept of FIG. 9, taken from a memory address space point of view, has access rights to various memory address spaces, for the different modules. As shown down the left side of FIG. 9, the rights are defined as—SR: Supervisor read, SW: Supervisor write, SX: Supervisor execute, UR: User read, UW: User write, UX: User execute. These access rights for the different modules in FIG. 9, are as follows.

The following memory address spaces have SR, SX (shown in normal font orientation)—lower BSP and OS. The following memory address spaces have SR, SX (shown in italicized font orientation)—lower BSP and SW-S/A. The following memory address space has UR, UX (shown in bold font orientation)—lower SW-C. The following memory address spaces have SR, SW (shown in normal font orientation)—upper BSP, SHARED, OS, and both HARDWARE REGISTERS. The following memory address spaces have SR, SW (shown in italicized font orientation)—upper BSP, SW-S/A, SHARED, and both HARDWARE REGISTERS. The following memory address space has UR, UW (shown in bold font orientation)—upper SW-C and SHARED. SG has rights on the entire memory address space on the e200z0 core, with no MMU (shown in a dashed box on the right of the memory address space).

The memory address space of FIG. 9 is configured as a static configuration, and is based on a linker output. This provides the user flexibility to define the regions, rights and the corresponding sizes.

Only BSP configures the MMU, such that when a miss is detected by the MMU, the BSP makes sure that the controller resets. The OS will configure the user and supervisor mode for the SW-S/A and SW-C and the OS will set the corresponding PID.

The basic safety strategy plans are: 1) ASIL (ISO 26262) decomposition principle is used to make a split-off between safety-related generic re-usable software (while following the QM process of Dana dFLAME software) and safety-related application specific software (implementing specifically the safety goals for a specific application while following an SIL process in dFLAME. 2) The safety-related generic re-usable software is mapped onto the SW-C and SW-S/A modules. 3) The safety-related application specific software is mapped onto the SG module. 4) The SW-C and SW-S/A cannot corrupt the SG code space and memory space. 5) The ECC is used for all entities, for both code space and memory space. 6) The SW-C and SW-S/A run on the e200z6 core. 7) The SG runs on the e200z0 core. 8) The SW-C and SW-S/A use the 512 KB SRAM unit. 9) The SG uses the 80 KB SRAM unit. 10) Both cores monitor each other periodically. 11) BSP is developed according to SIL. The monitoring of both cores is also known as "controller monitoring" (for example, E-Gas monitoring concept for engine management systems of gasoline and diesel engines).

This type of monitoring is function (application) independent, by way of question-answer algorithms.

Consequently, SG implements the safety goals in an application-specific way where two levels are defined: 1) Outputs are directly correlated to inputs and checked for safe behavior. 2) Function monitoring where Intermediate results in the SW-C and SW-S/A are checked for safe behavior.

Safety-related data that comes over CAN (e.g. engine speed) must be both available for the SW-S/A and SG. The callback of the CAN is to be developed according to SIL and specifically route safety related data to SG.

BSP is to be able to support both calls from SW-S/A and SG.

Consequently, the advantages of the instant invention are that the design and validation are only required of a small part of the functional safety related application according to SIL. The major parts of the functional safety related application are achieved according to QM levels and non-safety related applications are integrated with safety related applications. The design for all applications (safety related or not) is achieved by way of generic hardware/software. Hence, major parts of functional safety related applications are upgraded without re-certification. Thereby, saving an entity much time and labor costs.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A functional architecture pattern comprising:
    a first software module (SW-S/A), a second software module (SW-C), a run time module (dRTE), an operating system module (OS), a first board support package (BSP1), and a first microcomputer (µC1);
    a third software module (SG), a second board support package (BSP2), and a second microcomputer (µC2) that are logically separated from the first software module, the second software module, the run time module, the operating system module, the first board support package, and the first microcomputer;
    wherein the first software module, the second software module, and the run time environment module are developed according to quality management (QM) standards; and
    the operating system module, both first and second board support packages, and the third software module are developed according to safety integrity levels (SIL) standards so as to make a logical split-off between the first and second software modules and the third software module.

2. The functional architecture pattern of claim 1, wherein the first software module and the second software module comprise a logical unit separate from the third software module so as to have separate write code, write memory, and/or write data therefrom.

3. The functional architecture pattern of claim 1, wherein the first software module, the second software module, the run time module, the operating system module, both first and second board support packages, and the third software module reside in the same memory code and space, and on the same first microcomputer module, without the operating system module, both first and second board support packages, and the third software module being corrupted by the first software module, the second software module, and the run time module.

4. The functional architecture pattern of claim 1, wherein the third software module runs on a separate core (e200z0) of the second microcomputer that comprises an MCP5668EG and the second software module is only in communications within itself by way of the run time module.

5. The functional architecture pattern of claim 1, wherein the first software module is linked between the first board support package and the second software module.

6. The functional architecture pattern of claim 1, wherein the first software module, the second software module, and the run time module operate in supervisor mode.

7. The functional architecture pattern of claim 1, wherein both user mode and supervisor mode features, both cores e200z6 and e200z0, and MMU are supported, and both SRAM units having ECC are supported.

8. The functional architecture pattern of claim 1, wherein both user mode/supervisor modes, both cores e200z6 and e200z0, an 80 KB SRAM, a 512 KB SRAM, and an MMU in an MCP5668EG that are integrated with the first and second board support packages, are architecturally supported.

9. The functional architecture pattern of claim 1, wherein the operating system module is supplied by RTOS, the operating system module and board support package interrupts in supervisor mode, the first software module is operated in supervisor mode and only software component having first board support package access, and the first software module has read and write capability with shared memory.

10. The functional architecture pattern of claim 1, wherein when the second software module is operated in user mode, the first board support package is not accessible by the second software module, the second software module is not read and write capable of shared memory, and the third software module is operated in supervisor mode and is board support package accessible, and is readable of shared memory.

11. The functional architecture pattern of claim 1, wherein the third software module is determinable of a correct working of the first software module logical unit and the second software module logical unit, by way of a question-answer algorithm.

12. A functional architecture pattern comprising:
a first software module (SW), an operating system module (OS), a first board support package (BSP1), and a first microcomputer (μC1);
a second software module (SG), a second board support package (BSP2), and a second microcomputer (μC2) that are logically separated from the first software module, the operating system module, the first board support package, and the first microcomputer;
wherein the first software module is developed according to quality management (QM) standards; and
the operating system module, both first and second board support packages, and the second software module are developed according to safety integrity levels (SIL) standards so as to make a logical split-off on three levels between the first software module and the second software module.

13. The functional architecture pattern of claim 12, wherein inputs and outputs of the second software module are monitored by a logical unit of second software module to diagnose safety goal satisfaction.

14. The functional architecture pattern of claim 12, wherein the second software module is capable of intermediate results of the first software module for diagnosed safety goals satisfaction.

15. The functional architecture pattern of claim 12, wherein the second software module has a question-answer algorithm determinable of a correct operation of first software module logical unit.

* * * * *